(12) United States Patent
Wang

(10) Patent No.: US 10,852,578 B2
(45) Date of Patent: Dec. 1, 2020

(54) LIQUID CRYSTAL DISPLAY PANEL AND MANUFACTURING METHOD THEREOF

(71) Applicant: Wuhan China Star Optoelectronics Technology Co., Ltd., Wuhan (CN)

(72) Inventor: Wei Wang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/349,261

(22) PCT Filed: Dec. 26, 2018

(86) PCT No.: PCT/CN2018/124025
§ 371 (c)(1),
(2) Date: May 12, 2019

(87) PCT Pub. No.: WO2019/129097
PCT Pub. Date: Jul. 4, 2019

(65) Prior Publication Data
US 2020/0174311 A1    Jun. 4, 2020

(30) Foreign Application Priority Data
Dec. 27, 2017 (CN) .......................... 2017 1 1445687

(51) Int. Cl.
*G02F 1/1335* (2006.01)

(52) U.S. Cl.
CPC .. *G02F 1/133516* (2013.01); *G02F 1/133512* (2013.01)

(58) Field of Classification Search
CPC ..................... G02F 1/133512; G02F 1/133516
USPC .......................................................... 349/56
See application file for complete search history.

(56) References Cited

U.S. PATENT DOCUMENTS

2017/0005119 A1*   1/2017  Kang ................. G02F 1/13394

FOREIGN PATENT DOCUMENTS

| CN | 1556421 | 12/2004 |
|---|---|---|
| CN | 1556421 A * | 12/2004 |
| CN | 101101401 | 1/2008 |
| CN | 202205005 | 4/2012 |
| CN | 103149729 | 6/2013 |
| CN | 103293746 | 9/2013 |
| CN | 105068343 | 11/2015 |
| KR | 10-2007-0065065 | 6/2007 |

* cited by examiner

*Primary Examiner* — Nathanael R Briggs
*Assistant Examiner* — William D Peterson

(57) ABSTRACT

The present invention provides a liquid crystal display panel and a manufacturing method of the liquid crystal display panel. The display panel includes a color filter substrate. The color filter substrate includes a color resist layer. The color resist layer includes a first color resist region and a second color resist region. The first color resist region is arranged corresponding to a display region. The second color resist region is arranged corresponding to a non-display region.

3 Claims, 5 Drawing Sheets

LIQUID CRYSTAL DISPLAY PANEL AND MANUFACTURING METHOD THEREOF

RELATED APPLICATIONS

This application is a National Phase of PCT Patent Application No. PCT/CN2018/124025 having International filing date of Dec. 26, 2018, which claims the benefit of priority of Chinese Patent Application No. 201711445687.X filed on Dec. 27, 2017. The contents of the above applications are all incorporated by reference as if fully set forth herein in their entirety.

FIELD AND BACKGROUND OF THE INVENTION

The present invention relates to a field of manufacturing display panels and in particular, to a liquid crystal display panel and a manufacturing method thereof.

Liquid crystal displays (LCDs) are the most widely used display product in the market. Its manufacturing process technology is very mature, has a high product yield, relatively low production cost, and high market acceptance.

A liquid crystal display panel comprises a color filter (CF) substrate, an array substrate, and a liquid crystal sandwiched between the color filter substrate and the array substrate. The color filter substrate mainly includes a color filter layer that filters colored light by a color resist unit (R/G/B) and a black matrix (BM) that prevents light leakage at an edge of a pixel.

FIG. 1 is a film and layer structural diagram of a peripheral BM trench area in the prior art. After incident light passes through a first substrate 10, it passes through a red color resist block 30 and a blue color resist block 40 in sequence to enter the liquid crystal display. Due to a difference in thickness of the red and blue color resist blocks, outgoing light is still red, which causes a problem of red light leakage in the peripheral BM trench area, so the liquid crystal display fails to display normally.

SUMMARY OF THE INVENTION

The present application provides a liquid crystal display panel and a manufacturing method thereof to solve a technical problem of red light leakage in a peripheral BM trench area of a conventional liquid crystal display panel.

To solve the above problem, the technical solution provided by the present application is as follows:

The present invention provides a liquid crystal display panel, the liquid crystal display panel comprising a display region and a non-display region, the non-display region surrounding the display region, the liquid crystal display panel comprising:

an array substrate;

a color filter substrate disposed correspondingly to the array substrate, the color filter substrate comprising:

a first substrate;

a first black matrix formed on the first substrate; and a color resist layer formed on the first substrate, the color resist layer comprising:

a first color resist region disposed correspondingly to the display region;

a second color resist region disposed correspondingly to the non-display region, the second color resist region comprising a first color resist and a second color resist, the second color resist being formed on the first color resist.

In the liquid crystal display panel of the present invention, the first color resist region comprises at least one of a red color resist block, a green color resist block, and a blue color resist block; the second color resist region comprises one of the red color resist block, the green color resist block, and the blue color resist block.

In the liquid crystal display panel of the present invention, a thickness of the second black matrix is less than a thickness of the first black matrix.

In the liquid crystal display panel of the present invention, the liquid crystal display panel further comprises a liquid crystal layer, and the liquid crystal layer is disposed between the array substrate and the color filter substrate.

The present invention provides a manufacturing method of a liquid crystal display panel, comprising steps as follows:

S10: providing a first substrate, forming a black photoresist material on the first substrate, and patterning the black photoresist material to form a first black matrix;

S20: forming a color resist layer on the first substrate and patterning the color resist layer to form a first color resist layer, wherein the first color resist layer includes a first color resist region and a second color resist region, the first color resist region is disposed correspondingly to a display region of the display panel, and a second color resist region is disposed correspondingly to a non-display region of the display panel;

S30: forming a black photoresist material on the first color resist layer and patterning the black photoresist material to form a second black matrix, wherein the second black matrix is formed on a color resist block of the second color resist region, and a thickness the second black matrix is less than a thickness of the first black matrix; and

S40: providing a second substrate, bonding the second substrate to the first substrate, and injecting a liquid crystal material between the second substrate and the first substrate.

In the manufacturing method of the present invention, the first color resist region comprises at least one of a red color resist block, a green color resist block, and a blue color resist block; the second color resist region comprises one of the red color resist block, the green color resist block, and the blue color resist block.

In the manufacturing method of the present invention, the first black matrix and the second black matrix are produced in a same photomask process, which comprising:

S100: providing the first substrate and forming the first color resist layer on the first substrate, wherein the first color resist layer comprises the first color resist region and the second color resist region, the first color resist region is disposed correspondingly to the display region of the display panel, and the second color resist region is disposed correspondingly to the non-display region of the display panel;

S200: coating the black photoresist material on the first color resist layer, and forming the first black matrix and the second black matrix through a first photomask process, wherein the second black matrix is formed on a color resist block of the second color resist region; and

S300: providing a second substrate, bonding the second substrate to the first substrate, and injecting the liquid crystal material between the second substrate and the first substrate.

In the manufacturing method of the present invention, wherein step S200 comprises:

S201: forming the black photoresist material on the first color resist layer to form a light shielding layer;

S202: light-exposing the light shielding layer by using a multi-transmittance mask plate; and

S203: patterning the light shielding layer to form the first black matrix and the second black matrix after development.

In the manufacturing method of the present invention, the multi-transmittance mask plate comprises a first transmittance region, a second transmittance region, and a third transmittance region; and the second transmittance region is disposed correspondingly to a color resist of the second color resist region, the third transmittance region is disposed correspondingly to a color resist of first color resist region, and the first transmittance region is disposed correspondingly to a region except for the first color resist region and the second color resist region.

In the manufacturing method of the present invention, wherein the first transmittance region has zero light transmittance, the second transmittance region has a light transmittance of 50%, and the third transmittance region has a light transmittance of 100%.

The present invention provides a manufacturing method of a liquid crystal display panel, comprising steps as follows:

S10: providing a first substrate, forming a black photoresist material on the first substrate, and patterning the black photoresist material to form a first black matrix;

S20: forming a color resist layer on the first substrate and patterning the color resist layer to form a first color resist layer, wherein the first color resist layer includes a first color resist region and a second color resist region, the first color resist region is disposed correspondingly to a display region of the display panel, and a second color resist region is disposed correspondingly to a non-display region of the display panel;

S30: forming a black photoresist material on the first color resist layer, and patterning the black photoresist material to form a second black matrix, wherein the second black matrix is formed on a color resist block of the second color resist region; and S40: providing a second substrate, bonding the second substrate to the first substrate, and injecting a liquid crystal material between the second substrate and the first substrate.

In the manufacturing method of the present invention, the first color resist region comprises at least one of a red color resist block, a green color resist block, and a blue color resist block; the second color resist region comprises one of the red color resist block, the green color resist block, and the blue color resist block.

In the manufacturing method of the present invention, wherein the first black matrix and the second black matrix are produced in a same photomask process, comprising:

S100: providing a first substrate and forming a first color resist layer on the first substrate, wherein the first color resist layer comprises a first color resist region and a second color resist region, the first color resist region is disposed correspondingly to the display region of the display panel, and the second color resist region is disposed correspondingly to the non-display region of the display panel;

S200: coating the black photoresist material on the first color resist layer, and forming the first black matrix and the second black matrix through a first photomask process, wherein the second black matrix is formed on the color resist block of the second color resist region; and S300: providing the second substrate, bonding the second substrate to the first substrate, and injecting the liquid crystal material between the second substrate and the first substrate.

In the manufacturing method of present invention, step S200 comprises:

S201: forming a black photoresist material on the first color resist layer to form a light shielding layer;

S202: light-exposing the light shielding layer by using a multi-transmittance mask plate; and S203: patterning the light shielding layer to form the first black matrix and the second black matrix after development.

In the manufacturing method of the present invention, the multi-transmittance mask plate comprises a first transmittance region, a second transmittance region, and a third transmittance region; and the second transmittance region is disposed correspondingly to a color resist of the second color resist region, the third transmittance region is disposed correspondingly to a color resist of first color resist region, and the first transmittance region is disposed correspondingly to a region except for the first color resist region and the second color resist region.

In the manufacturing method of the present invention, wherein the first transmittance region has zero light transmittance, the second transmittance region has a light transmittance of 50%, and the third transparency region has a light transmittance of 100%.

Advantageous effects: The present application sets the second black matrix (BM) on the color resist disposed correspondingly to the non-display area of the display panel to eliminate the technical problem of a leakage of colored light in the peripheral BM trench area, so that the liquid crystal display panel displays normally.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DESCRIPTION OF SPECIFIC EMBODIMENTS OF THE INVENTION

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

The present invention provides a liquid crystal display panel. The liquid crystal display panel comprises a display region and a non-display region. The non-display region surrounds the display region.

According to one embodiment of the present invention, the liquid crystal display panel comprises an array substrate, a color filter substrate, and a liquid crystal layer disposed between the array substrate and the color filter substrate.

Figure 1:
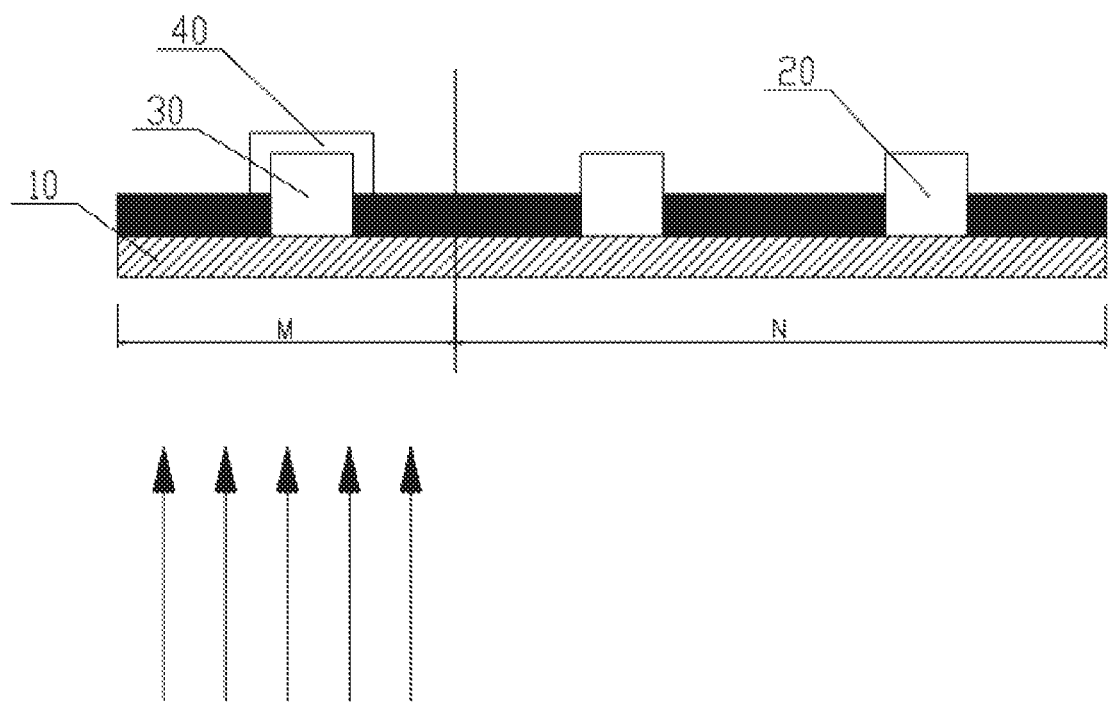
FIG. 1 is a schematic film and layer structural view illustrating a conventional color filter substrate.
Figure 2:
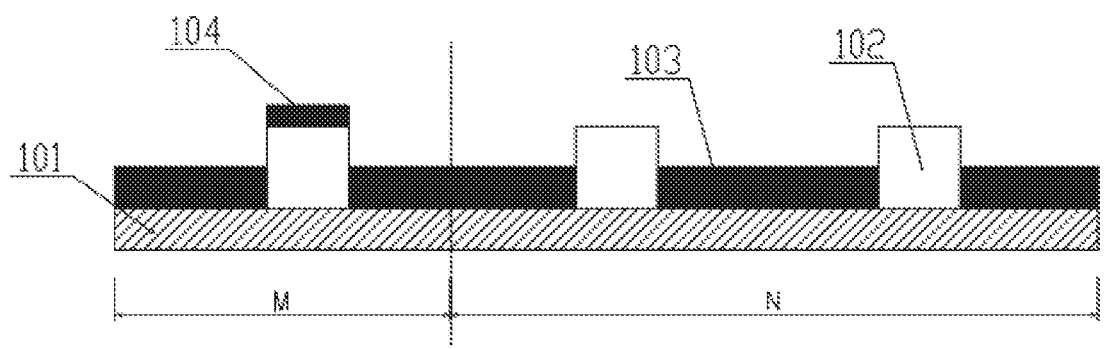
FIG. 2 is a schematic film and layer structural view illustrating a color filter substrate according to a first embodiment of the present invention.

Please refer to FIG. 2, which is a schematic film and layer structural view illustrating a color filter substrate according to a first embodiment of the present invention. The color filter substrate is disposed correspondingly to the array substrate. The color filter substrate comprises a first substrate 101, a color resist layer 102, and a first black matrix 103.

According to one embodiment of the present invention, the first substrate 101 is made of material the same as material of a glass substrate of the array substrate.

A first color resist layer 102 is disposed on a surface of the first substrate 101.

The first color resist layer 102 comprises a first color resist region N and a second color resist region M. The first color resist region N is disposed correspondingly to the display region of the display panel.

According to one embodiment of the present invention, the first color resist region N comprises at least one of a red color resist block, a green color resist block, and a blue color resist block.

According to one embodiment of the present invention, the second color resist region M is disposed correspondingly to the non-display region of the display panel. The second color resist region M comprises one of the red color resist block, the green color resist block, and the blue color resist block.

According to one embodiment of the present invention, the black matrix is configured to separate adjacent color resists to block color gaps and to prevent light leakage or color mixing.

One side of the color filter substrate comprises the first black matrix 103 and a second black matrix 104. The first black matrix 103 is formed on the first substrate 101, so that color resist blocks in the color resist layer 102 are separated from each other. The second black matrix 104 is disposed on the color resist blocks in the second color resist region N.

In order to ensure a thickness of the liquid crystal display panel, a thickness of the second black matrix 104 and a thickness of the first black matrix 103 can be adjusted appropriately.

According to one embodiment of the present invention, the thickness of the second black matrix 104 is less than the thickness of the first black matrix 103.

In the liquid crystal display panel of the present invention, incident light outputs red light through the red color resist block. Due to the presence of the second black matrix 104, when the incident light passes through the red color resist block, the output red light is blocked by the second black matrix 104, thereby eliminating a problem of red light leakage in the non-display area of the display panel.

According to one embodiment of the present invention, the red color resist block can be a blue color resist block or a green color resist block; the present invention is not limited in this regard.

Figure 3:
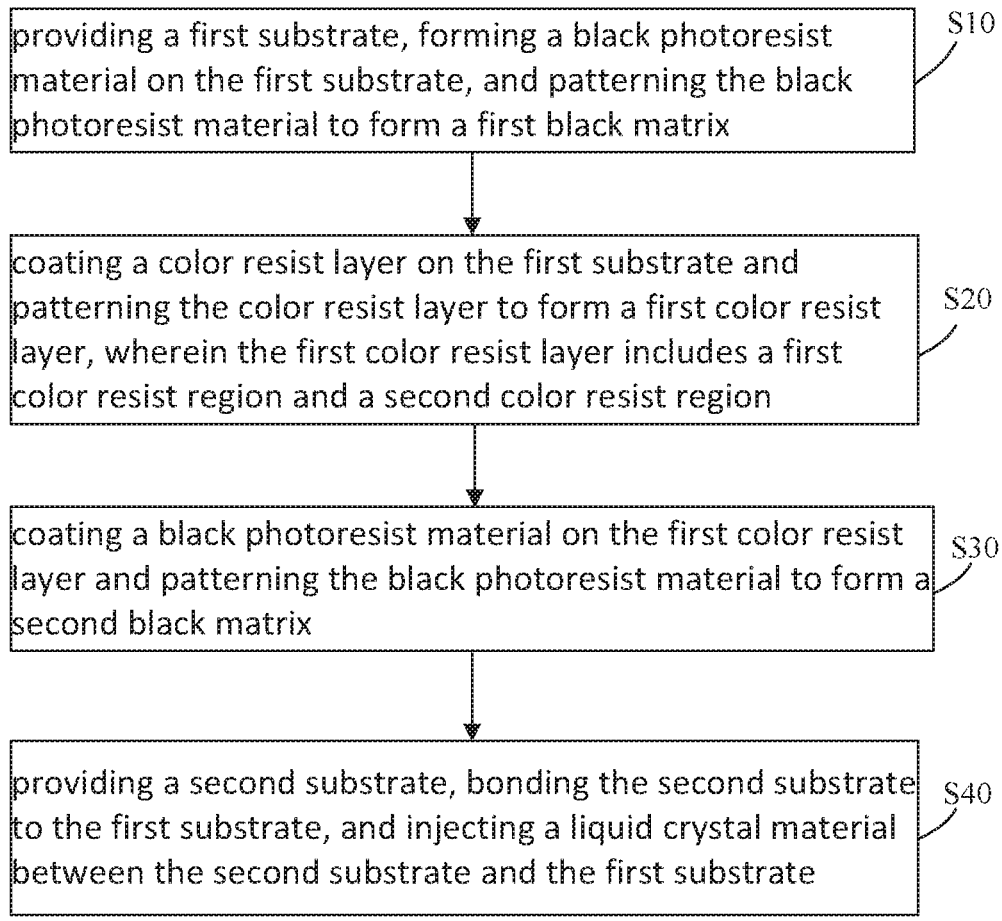
FIG. 3 is a process flow diagram illustrating a manufacturing method of a liquid crystal display panel according to a second embodiment of the present invention.

Please refer to FIG. 3, which is a process flow diagram illustrating a manufacturing method of a liquid crystal display panel according to a second embodiment of the present invention.

Please refer to FIG. 4. FIGS. 4A to 4D are schematic views illustrating a process flow of the manufacturing method of the liquid crystal display panel according to the second embodiment of the present invention.

The manufacturing method comprises:

S10: providing a first substrate 201, forming a black photoresist material on the first substrate 201, and patterning the black photoresist material to form a first black matrix 203.

Figure 4A:
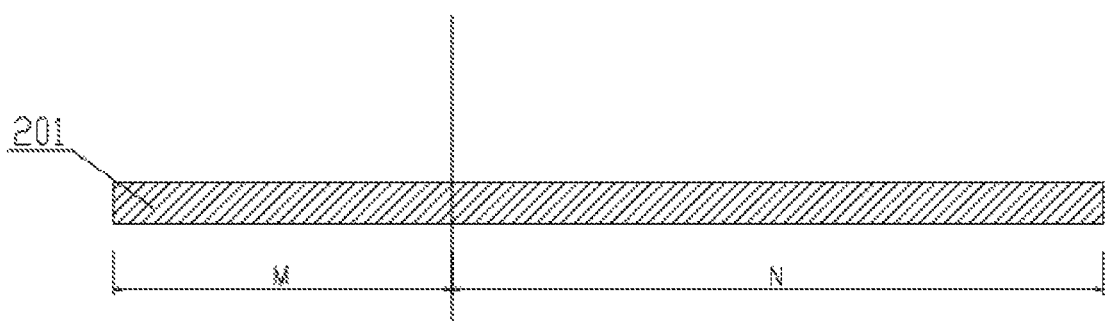
FIGS. 4A, 4B, 4C and 4D are schematic views illustrating a process flow of the manufacturing method of the liquid crystal display panel according to the second embodiment of the present invention.
Figure 4B:
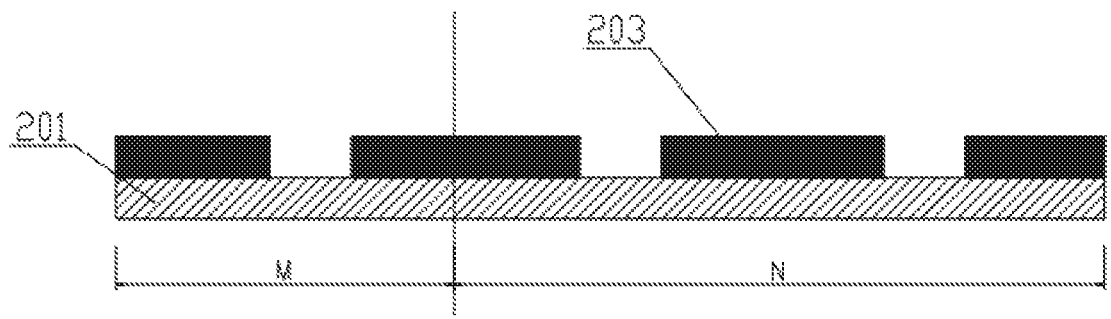

Please refer to FIGS. 4A to 4B of providing the first substrate 201, coating the black photoresist material on the first substrate 201, and patterning the black photoresist material through a first photomask process to form the first black matrix 203.

S20: forming a color resist layer on the first substrate 201 and patterning the color resist layer to form a first color resist layer 203, wherein the first color resist layer 203 comprises a first color resist region N and a second color resist region M.

Figure 4C:
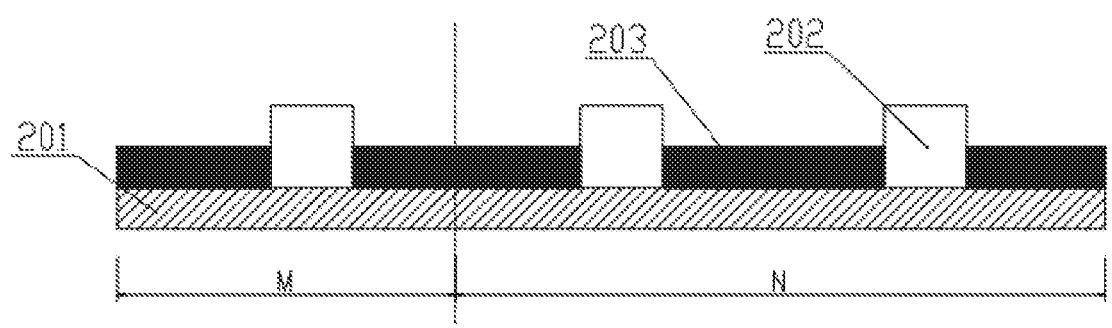

Referring to FIG. 4C, the first color resist region N is disposed correspondingly to a display region of the display panel. The first color resist region comprises at least one of a red color resist block, a green color resist block, and a blue color resist block.

The second color resist region M is disposed correspondingly to a non-display region of the display panel. The second color resist region 205 comprises one of the red color resist block, the green color resist block, and the blue color resist block.

S30: forming a black photoresist material on the first color resist layer 203, and patterning the black photoresist material to form a second black matrix 204.

Figure 4D:
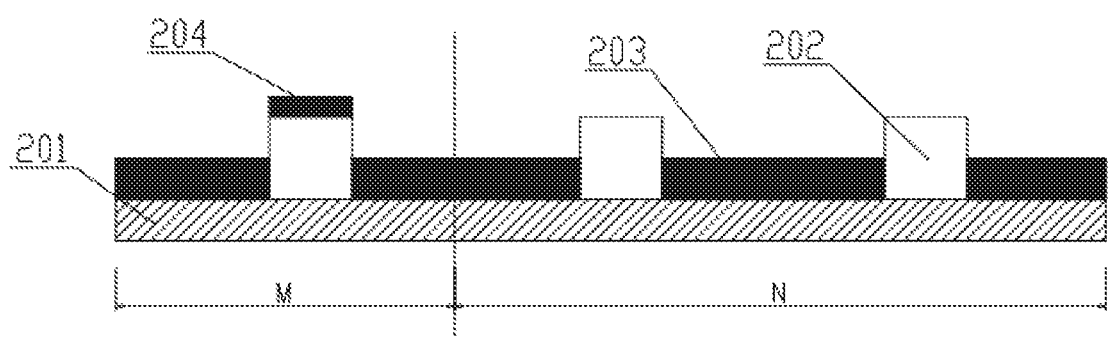

Please refer to FIG. 4D. The black photoresist material is coated on the first color resist layer 203. The black photoresist material is patterned as in step S20, and only the black photoresist material on a color resist block of the second color resist region M is reserved to form the second black matrix 204. In other words, the second black matrix 204 is formed on the color resist block of the second color resist region M.

Step S40: providing a second substrate, bonding the second substrate to the first substrate 201, and injecting a liquid crystal material between the second substrate and the first substrate 201.

In the liquid crystal display panel of the present invention, the incident light outputs red light through the red color resist block. Due to the presence of the second black matrix 104, when the incident light passes through the red color resist block, the output red light is blocked by the second black matrix 104, thereby eliminating a problem of red light leakage in the non-display region of the display panel.

According to one embodiment of the present invention, the red color resist block can be a blue color resist block or a green color resist block; the present invention is not limited in this regard.

Figure 5:
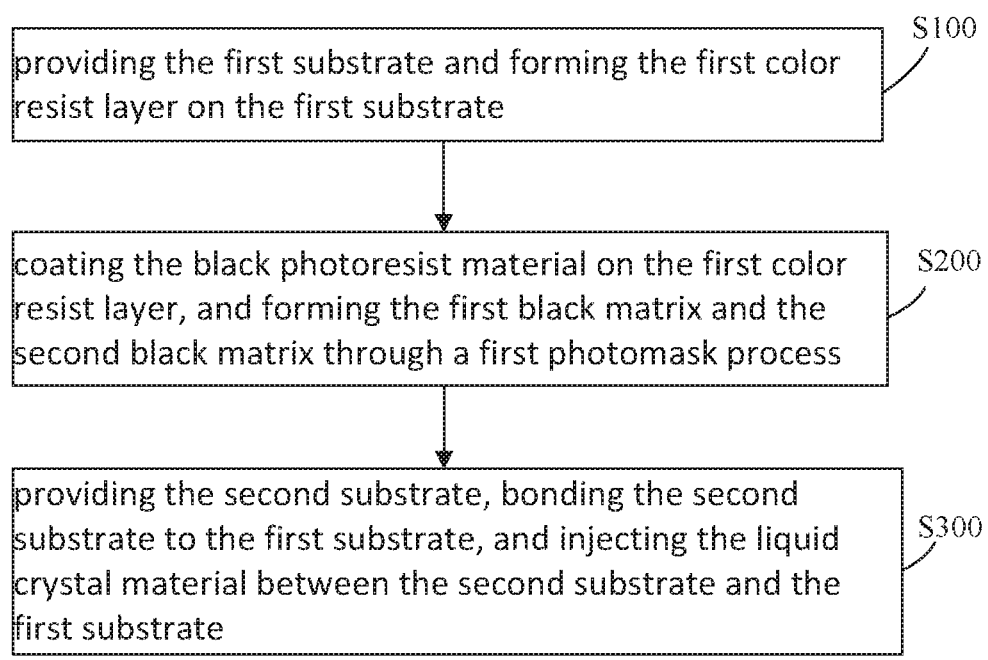
FIG. 5 is a process flow diagram illustrating a manufacturing method of a liquid crystal display panel according to a third embodiment of the present invention.

Please refer to FIG. 5, which is a process flow diagram illustrating a manufacturing method of a liquid crystal display panel according to a third second embodiment of the present invention.

Figure 6A:
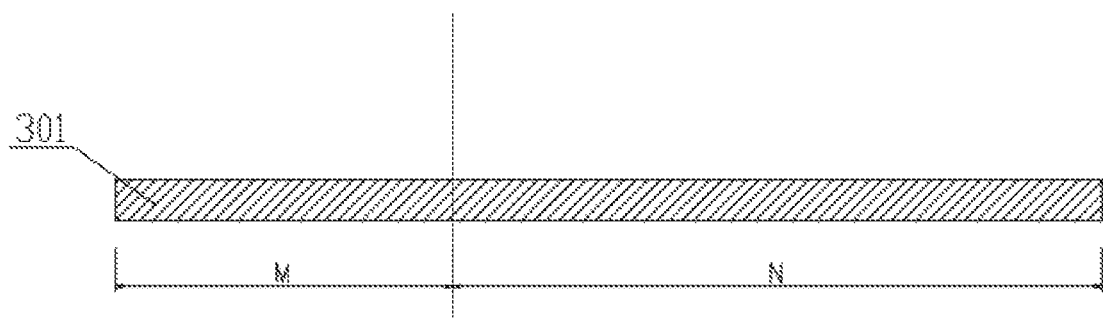
FIGS. 6A, 6B and 6C are schematic views illustrating a process flow of the manufacturing method of the liquid crystal display panel according to the third embodiment of the present invention.
Figure 6B:
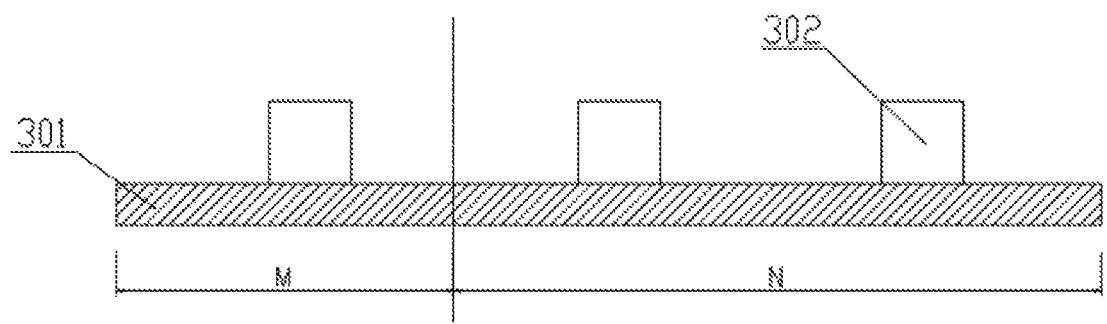
Figure 6C:
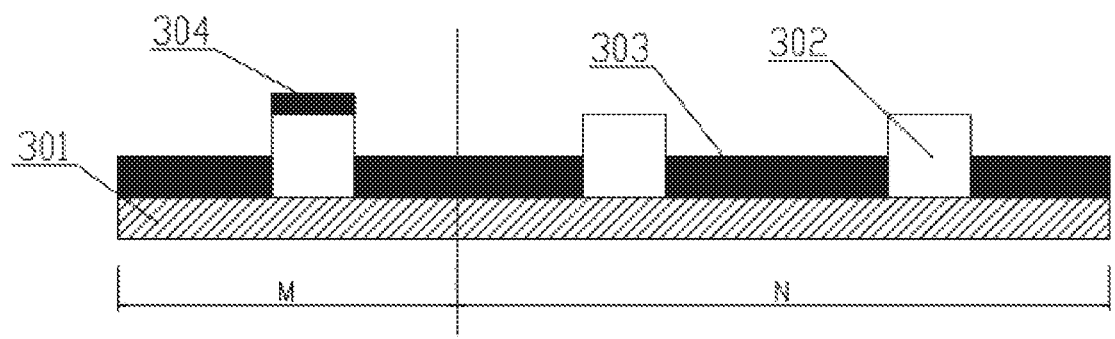

Please refer to FIGS. 6A to 6C, which are schematic views illustrating a process flow of the manufacturing method of the liquid crystal display panel according to the third embodiment of the present invention.

The manufacturing method comprises:

S100: providing a first substrate 301 and forming a first color resist layer 302 on the first substrate 301.

Please refer to FIGS. 6A to 6B. In this step:

The first color resist layer 302 comprises a first color resist region N and a second color resist region M, the first color resist region N is disposed correspondingly to a display region of the display panel, and the second color resist region M is disposed correspondingly to a non-display region of the display panel.

The first color resist region N comprises one of a red color resist block, a green color resist block, and a blue color resist block. The second color resist region M is disposed correspondingly to a non-display region of the display panel. The second color resist region M comprises one of the red color resist block, the green color resist block, and the blue color resist block.

According to one embodiment of the present invention, the first color resist region N is disposed correspondingly to the red color resist block.

S200: coating a black photoresist material on the first color resist layer 302, and forming a first black matrix 303 and a second black matrix 304 through a first photomask process, wherein the second black matrix 304 is formed on a color resist block of the second color resist region M.

Referring to FIG. 6C, the black photoresist material is coated on the first color resist layer 302 to form the first black matrix 303.

According to one embodiment of the present invention, the black photoresist material consists of a negative photoresist or a positive photoresist.

According to one embodiment of the present invention, the black photoresist material consists of a positive photoresist.

According to one embodiment of the present invention, the light shielding layer is exposed to light using a multi-transmittance mask plate.

The multi-transmittance mask plate comprises a first transmittance region, a second transmittance region, and a third transmittance region. The light transmittance in the first transmittance region, the second transmittance region, and the third transmittance region are sequentially increased.

The second transmittance region is disposed correspondingly to the first color resist layer 302 of the non-display region, the third transmittance region is disposed correspondingly to the first color resist layer 302 of the display region, and the first transmittance region is disposed correspondingly to a region except for the first color resist layer 302.

According to one embodiment, the first transmittance region has zero light transmittance, the second transmittance region has a light transmittance of 50%, and the third transmittance region has a light transmittance of 100%. The light transmittance of each region of the mask plate can be adjusted according to actual demands in order to adjust a thickness of the second black matrix.

Finally, patterning the light shielding layer to form the first black matrix 303 and the second black matrix 304 after development.

The second black matrix 304 is disposed on the color resist block in the first color resist region N. In order to ensure a thickness of the liquid crystal display panel, a thickness of the second black matrix 304 and a thickness of the first black matrix 303 can be adjusted appropriately.

According to one embodiment of the present invention, a thickness of the second black matrix 304 is less than a thickness of the first black matrix 303.

S300: providing a second substrate, bonding the second substrate to the first substrate 301, and injecting a liquid crystal material between the second substrate and the first substrate 301.

In the liquid crystal display panel, incident light outputs red light through a red color resist block. Due to the presence of the second black matrix 304, when the incident light passes through the red color resist block, the output red light is blocked by the second black matrix 304, thereby eliminating a problem of red light leakage in the non-display area of the display panel.

According to one embodiment of the present invention, the red color resist block can also be a blue color resist block or a green color resist block; the present invention is not limited in this regard.

The present invention provides a liquid crystal display panel and a manufacturing method. The display panel comprises a display region and a non-display region. The non-display region surrounds the display region. The display panel comprises an array substrate, a liquid crystal layer, and a color filter substrate. The color filter substrate comprises a color resist layer. The color resist layer comprises a first color resist region and a second color resist region. The first color resist region N is disposed correspondingly to the display region. The second color resist region is disposed correspondingly to the non-display region. A second black matrix is formed on a color resist block of the second color resist region to eliminate the technical problem of a leakage of colored light in a peripheral black matrix (BM) trench region, so that the liquid crystal display panel displays normally.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A manufacturing method of a liquid crystal display panel, comprising steps as follows:

S10: providing a first substrate, forming a black photoresist material on the first substrate, and patterning the black photoresist material to form a first black matrix;

S20: forming a color resist layer on the first substrate and patterning the color resist layer to form a first color resist layer, wherein the first color resist layer includes a first color resist region and a second color resist region, the first color resist region is disposed correspondingly to a display region of the display panel, and a second color resist region is disposed correspondingly to a non-display region of the display panel;

S30: forming a black photoresist material on the first color resist layer and patterning the black photoresist material to form a second black matrix, wherein the second black matrix is formed on a color resist block of the second color resist region;

wherein the first black matrix and the second black matrix are produced in a same photomask process, comprising:

S100: providing the first substrate and forming the first color resist layer on the first substrate, wherein the first color resist layer comprises the first color resist region and the second color resist region, the first color resist region is disposed correspondingly to the display region of the display panel, and the second color resist region is disposed correspondingly to the non-display region of the display panel;

S200: coating the black photoresist material on the first color resist layer, and forming the first black matrix and the second black matrix through a first photomask process, wherein the second black matrix is formed on the color resist block of the second color resist region;

wherein step S200 comprises:

S201: forming the black photoresist material on the first color resist layer to form a light shielding layer;

S202: light-exposing the light shielding layer by using a multi-transmittance mask plate; and S203: patterning the light shielding layer to form the first black matrix and the second black matrix after development;

S300: providing the second substrate, bonding the second substrate to the first substrate, and injecting the liquid crystal material between the second substrate and the first substrate;

S40: providing a second substrate, bonding the second substrate to the first substrate, and injecting a liquid crystal material between the second substrate and the first substrate, wherein the multi-transmittance mask plate comprises a first transmittance region, a second transmittance region, and a third transmittance region; the second transmittance region is disposed correspondingly to a color resist of the second color resist region, the third transmittance region is disposed correspondingly to a color resist of the first color resist region, and the first transmittance region is disposed correspondingly to a region except for the first color resist region and the second color resist region.

2. The manufacturing method according to claim 1, wherein the first color resist region comprises at least one of a red color resist block, a green color resist block, and a blue color resist block; and the second color resist region comprises one of the red color resist block, the green color resist block, and the blue color resist block.

3. The manufacturing method according to claim 1, wherein the first transmittance region has zero light transmittance, the second transmittance region has a light transmittance of 50%, and the third transmittance region has a light transmittance of 100%.

* * * * *